United States Patent [19]

Griffiths et al.

[11] Patent Number: 5,177,303

[45] Date of Patent: Jan. 5, 1993

[54] PROCESS FOR HYDROCARBON CONVERSION

[75] Inventors: David C. Griffiths, Addlestone; Brian Kneale, Knaphill, both of England

[73] Assignee: The British Petroleum Company, p.l.c., London, England

[21] Appl. No.: 814,462

[22] Filed: Dec. 30, 1991

Related U.S. Application Data

[60] Division of Ser. No. 691,678, Apr. 25, 1991, Pat. No. 5,110,781, which is a continuation of Ser. No. 203,010, Jun. 6, 1988, abandoned.

[30] Foreign Application Priority Data

Jun. 23, 1987 [GB] United Kingdom ............... 8714661

[51] Int. Cl.⁵ .............................................. C01B 3/26
[52] U.S. Cl. ..................... 585/943; 423/653; 423/654; 252/373
[58] Field of Search .............. 585/653, 500, 943; 423/654; 252/373

[56] References Cited

U.S. PATENT DOCUMENTS

| | | | |
|---|---|---|---|
| Re. 28,655 | 12/1971 | Rostrup-Nielsen | 423/654 |
| 3,919,120 | 11/1975 | Kato et al. | 502/327 |
| 4,123,391 | 10/1978 | Noguchi et al. | 502/333 |
| 4,162,290 | 7/1979 | Crawford et al. | 423/652 |
| 4,185,967 | 1/1980 | Komodromos et al. | 502/314 |
| 4,237,030 | 12/1980 | Noguchi et al. | 502/334 |
| 4,371,513 | 2/1983 | Sanchez et al. | 502/355 |
| 4,409,127 | 10/1983 | Keppel et al. | 502/355 |
| 4,542,113 | 9/1955 | Meyer et al. | 502/355 |
| 4,621,163 | 11/1986 | Kolts | 585/653 |
| 4,888,130 | 12/1989 | Banquy | 252/373 |
| 5,081,324 | 1/1992 | Michaels et al. | 585/500 |
| 5,093,540 | 3/1992 | Forehover et al. | 585/653 |
| 5,105,046 | 4/1992 | Washecheck | 585/500 |
| 5,110,781 | 5/1992 | Griffiths | 502/335 |

FOREIGN PATENT DOCUMENTS

| | | | |
|---|---|---|---|
| 2652556 | 6/1977 | Fed. Rep. of Germany | 502/335 |
| 1457936 | 12/1976 | United Kingdom | 502/355 |
| 1499601 | 7/1978 | United Kingdom | 585/733 |

OTHER PUBLICATIONS

Chemical Abstracts 105:140513f.
Chemical Abstracts 98:205037n.

*Primary Examiner*—Anthony McFarlane
*Attorney, Agent, or Firm*—Brooks Haidt Haffner & Delahunty

[57] ABSTRACT

A process for the conversion of hydrocarbons using an alumina-based catalyst which is prepared by
(a) selecting an alumina catalyst having a bulk density of at least 0.6 g/ml and a pore volume of less than 0.6 ml/g;
(b) heating the alumina of (a) to a temperature of at least 1000° C. in the presence of a sintering agent containing at least one metal selected from nickel, chromium, cobalt and platinum; and
(c) recovering a sintered alumina-based catalyst having a bulk density and an attrition resistance greater than that of the alumina of (a). Catalysts prepared by this process are useful in hydrocarbon conversion processes.

4 Claims, No Drawings

PROCESS FOR HYDROCARBON CONVERSION

This is a division of application Ser. No. 691,678, filed Apr. 25, 1991, now U.S. Pat. No. 5,110,781, which, in turn, is a continuation of application Ser. No. 203,010, filed Jun. 6, 1988, now abandoned.

This invention relates to the production of alumina-based catalysts having a high resistance to attrition.

Steam reforming is an important method for the production of synthesis gas from natural gas. A mixture of steam and gaseous paraffinic hydrocarbons, primarily methane, is passed over a catalyst at high temperatures. Such processes are described for example in GB-A-1569014, GB-A-1550754 and GB-A-1550754. Partial oxidation of gaseous paraffinic hydrocarbons with oxygen or a molecular oxygen containing gas is another method of generating synthesis gas.

Alumina-based catalysts are useful in this area and in a variety of other hydrocarbon conversion reactions. They may be used in fixed, moving, or recirculating particulate bed reactors. In all types of bed, resistance to attrition is important. There can be considerable breakdown of catalyst during the filling of fixed catalyst bed reactors and, clearly, catalysts in moving or recirculating particulate bed reactors, have to be attrition resistant. The shape of the catalyst particles can vary but they are preferably spheroidal to give uniform bed packing. A convenient method of making spheroidal alumina catalysts is the oil-drop method, in which drops of an alumina hydrosol and a gelling agent are passed into a hot oil bath. A method of preparing high density, high crush strength spheroidal alumina from alumina hydrates by the oil drop method is described and claimed in U.S. Pat. No. 4,542,113 and involves using an alumina sol of defined characteristics and incorporating urea in the sol.

The present invention is concerned with the sintering of a alumina catalyst of defined characteristics to increase its resistance to attrition.

According to the present invention, the preparation of an alumina-based catalyst having improved resistance to attrition comprises:
(a) selecting an alumina catalyst having a bulk density of at least 0.6 g/ml and a pore volume of less than 0.6 ml/g;
(b) heating the alumina of (a) to a temperature of at least 1000° C. in the presence of a sintering agent containing at least one metal selected from nickel, chromium, cobalt and platinum; and
(c) recovering a sintered alumina-based catalyst having a bulk density and an attrition resistance greater than that of the alumina of (a).

Preferably the finished catalyst has a bulk density of at least 1.5 g/ml and an attrition resistance as measured by attrition loss of less than 0.01% wt/hour.

The attrition test specified herein involves subjecting a recirculating bed of solids to a high velocity gas jet (300 to 400 m/s) and monitoring weight loss against time.

Preferably, the sintering agent contains chromium, cobalt or, especially, nickel. The amount of sintering agent used depends on the desired application of the finished catalyst; preferably said amount is such as to produce a finished catalyst containing at least 5, preferably at least 8, % wt of metal.

The starting alumina is important, it having been found that apparently similar aluminas respond very differently to the sintering treatment. The preferred alumina catalyst is a spheroidal alumina catalyst and the preferred method of preparing a spheroidal alumina catalyst suitable for use as the starting material for the present invention is that described in U.S. Pat. No. 4,542,113.

The sintering temperature to which the alumina catalyst is subjected may suitably be at least 1200° C. A practical upper temperature limit may be 1500° C. The sintering may be carried out in a flowing stream of air or oxygen containing inert gas or in a non-reducing atmosphere and the heating up and cooling down of the catalyst may be at a uniform and fairly low rate (e.g. about 2° C./minute) to avoid undue thermal stress on the catalyst.

An important feature of the sintering process is that it is carried out in the presence of a sintering agent containing at least one metal selected from nickel, chromium, cobalt and platinum. The metal is preferably in the form of an oxide. Nickel oxide is preferred.

Nickel, chromium, cobalt and platinum are well-known catalytic components of alumina-based catalysts, for example partial oxidation and steam reforming catalysts. The use of such a metal in the process of the invention serves a dual purpose: that of producing a catalyst, preferably a partial oxidation or steam reforming catalyst, containing the metal as catalytic component, and also that of acting as a sintering agent. The sintering agent may be added to the alumina-based catalyst at any convenient stage in the catalyst preparation prior to the sintering and using any convenient technique. While it is believed that it is the metal oxide which acts as the actual sintering agent, the metal may be added as a decomposable compound by impregnation e.g. as a nickel salt in the case of the preferred sintering agent.

Nickel-alumina catalysts are well known catalysts in processes for the conversion of hydrocarbons and the sintered nickel-alumina catalysts of the present invention may be used in any such process for which nickel-alumina is a known catalyst. Further, since the sintering is carried out at a temperature of at least 1000° C., it follows that the catalyst produced can be used in high temperature processes where temperatures of the order of 1000° C. or higher may be required.

The invention further provides a process for the conversion of hydrocarbons, which comprises passing steam or a molecular oxygen containing gas and a gaseous paraffinic hydrocarbon feedstock over a catalyst prepared by the process of the invention.

It is believed that the characteristic of the finished catalyst which gives it its attrition resistance and high bulk density is its uniform microstructure comprised of large areas of well sintered material with a typical grain size of about 0.1 μm.

The invention is illustrated by the following examples.

EXAMPLE 1

Two commercially available alumina spheres were used as starting materials. One material (the material according to the present invention) was produced by a method similiar to that of U.S. Pat. No. 4,542,113.

The other (the comparative material not according to the present invention) was obtained from another catalyst manufacturer.

Both materials were in the form of spheres of approximately 2 mm diameter, and both consisted essentially of gamma-alumina. The physical characteristics of the material according to the invention prior to impregnation were as shown in Table 1 below.

TABLE 1

|  |  | Al₂O₃ of the present invention |
|---|---|---|
| Pore volume | ml/g | 0.48 |
| Nitrogen, BET, surface area | m²/g | 220 |
| Bulk density | g/ml | 0.78 |
| Gamma-Al₂O₃ crystallite size | A | 50 |

The alumina according to the invention was characterised by a fairly low pore volume and relatively high bulk density, indicating microporosity.

Each of the aluminas was impregnated with nickel nitrate using the pore fill/incipient wetness technique, and calcined to convert the nickel nitrate to nickel oxide under conditions known to those skilled in the art and then sintered at 1200° C. The amount of nickel nitrate used was such as to give 10% wt nickel in the finished catalysts. The characteristics of the sintered catalyst according to the invention is given in Table 2 below, the attrition loss being determined under comparable conditions.

TABLE 2

|  |  | Catalyst of the present invention |
|---|---|---|
| Pore volume | ml/g | 0.09 |
| N₂ BET, surface area | m²/g | 3 |
| Bulk density | g/ml | 2.0 |
| Attrition loss | % wt/hr/l | 0.008 |
| Grain size | um | 0.1–0.2 |
| Agglomerate size | um | 10 |

The attrition loss of the catalyst not according to the present invention was 0.03% wt/hr/l. The predominant characteristic of the catalyst according to the invention was a very uniform microstructure comprised of large areas of well-sintered material with typical grain size, 0.1 μm. In comparison, the microstructure of the comparative catalyst contained large numbers of areas of loosely-packed (poorly sintered) material, termed agglomerates which give rise to a weaker material. The agglomerates (10 μm dia.) were present in both materials but were far fewer in number in the preferred catalyst.

The catalyst according to the invention had a much higher bulk density, lower surface area and much reduced pore volume. Its resistance to attrition was an order of magnitude greater than the comparative material.

EXAMPLE 2

This example shows the benefit of having nickel oxide present as a sintering agent.

Samples of the alumina spheres of Example 1 were impregnated with differing amounts of nickel nitrate to give catalysts with 0, 5 and 10% wt of nickel. Each catalyst was then sintered as per Example 1. Table 3 below shows the affect of the addition of nickel.

TABLE 3

| wt % Nickel | Bulk Density g/ml | Attrition Rate wt %/hr/l (gas) |
|---|---|---|
| 0 | 1.3 | 0.050 |
| 5 | 1.7 | 0.035 |

TABLE 3-continued

| wt % Nickel | Bulk Density g/ml | Attrition Rate wt %/hr/l (gas) |
|---|---|---|
| 10 | 2.0 | 0.008 |

It will be seen that the addition of nickel markedly increases the bulk density and attrition resistance of the sintered alumina.

EXAMPLE 3

The general method of Example 2 was repeated using a wider range of concentrations of nickel. In all cases, the addition of nickel improved the attrition resistance of the catalyst, the results being given in Table 4 in which the relative attrition index is the observed rate of attrition (wt %/hr) per unit throughput of gas (1/min) relative to the base alumina.

TABLE 4

| wt % Nickel | Bulk Density g/ml | Relative Attrition Index |
|---|---|---|
| 0 | 1.30 | 1.0 |
| 10 | 1.78 | 0.16 |
| 15 | 1.94 | 0.16 |
| 20 | 2.02 | 0.16 |

EXAMPLE 4

The general method of Example 1 was repeated using a range of different metals. The results are given in Table 5, which includes the use of palladium as a comparison not within the scope of the invention.

TABLE 5

| Metal 10% by wt | Bulk Density g/ml | Relative Attrition Index |
|---|---|---|
| Pd (comparison) | 1.30 | 2.30 |
| Ni | 2.01 | 0.16 |
| Cr | 1.39 | 0.81 |
| Co | 1.64 | 0.35 |
| Base alumina | 1.30 | 1.0 |

It can be seen that the use of nickel, chromium and cobalt as sintering agent improved the attrition resistance of the catalyst, whereas the use of palladium decreased the attrition resistance.

We Claim:

1. A process for the conversion of hydrocarbons to form synthesis gas which comprises passing steam or a molecular oxygen containing gas and a gaseous paraffinic hydrocarbon feedstock over an alumina based catalyst which is prepared by a method which comprises: (a) selecting a gamma alumina catalyst having a bulk density of at least 0.6 g/ml and a pore volume of less than 0.6 ml/g; (b) heating the alumina of (a) to a temperature of at least 1200° C. in the presence of a nickel containing sintering agent in an amount to give at least 5% by weight of nickel and (c) recovering a sintered alumina-based catalyst having a bulk density and an attrition resistance greater than that of the alumina of (a).

2. A process as claimed in claim 1 in which the paraffinic hydrocarbon comprises methane.

3. A process as claimed in claim 1 in which the alumina based catalyst recovered has an attrition resistance as measured by attrition loss of less than 0.01% wt./hour.

4. A process as defined in claim 1 wherein the contact of the reactants with the catalyst is effected at a temperature of 1000° C. or higher.

* * * * *

UNITED STATES PATENT AND TRADEMARK OFFICE
CERTIFICATE OF CORRECTION

PATENT NO. : 5,177,303
DATED : January 5, 1993
INVENTOR(S) : DAVID C. GRIFFITHS and BRIAN KNEALE It is certified that error appears in the above-identified patent and that said Letters Patent is hereby corrected as shown below:

In the Abstract, line 2, there should be a colon (:) after the word "by"

Column 4:

Claim 1, line 2, insert a comma (,) after the word "gas"

Signed and Sealed this

Twenty-first Day of December, 1993

Attest:

BRUCE LEHMAN

Attesting Officer     Commissioner of Patents and Trademarks